United States Patent
Chhorng et al.

(10) Patent No.: US 11,843,121 B2
(45) Date of Patent: Dec. 12, 2023

(54) METHOD AND SYSTEM FOR CONTINUOUS LAMINATION OF BATTERY ELECTRODES

(71) Applicant: Enevate Corporation, Irvine, CA (US)

(72) Inventors: Monika Chhorng, Irvine, CA (US); Jose Vega, Irvine, CA (US); Benjamin Park, Mission Viejo, CA (US); Giulia Canton, Irvine, CA (US); Fred Bonhomme, Lake Forest, CA (US)

(73) Assignee: ENEVATE CORPORATION, Irvine, CA (US)

( * ) Notice: Subject to any disclaimer, the term of this patent is extended or adjusted under 35 U.S.C. 154(b) by 0 days.

(21) Appl. No.: 16/681,716

(22) Filed: Nov. 12, 2019

(65) Prior Publication Data

US 2021/0143438 A1 May 13, 2021

(51) Int. Cl.
*H01M 4/66* (2006.01)
*H01M 4/38* (2006.01)
*H01M 4/1399* (2010.01)
*H01M 4/04* (2006.01)
*H01M 10/0569* (2010.01)

(52) U.S. Cl.
CPC .......... *H01M 4/667* (2013.01); *H01M 4/0471* (2013.01); *H01M 4/1399* (2013.01); *H01M 4/386* (2013.01); *H01M 10/0569* (2013.01)

(58) Field of Classification Search
CPC .. H01M 4/0471; H01M 4/0404; H01M 4/134; H01M 4/137; H01M 4/1395; H01M 4/1399; H01M 4/386; H01M 4/622; H01M 4/661; H01M 4/667
See application file for complete search history.

(56) References Cited

U.S. PATENT DOCUMENTS

| | | | | |
|---|---|---|---|---|
| 2014/0065464 A1* | 3/2014 | Masarapu | ........... | H01M 10/446 429/149 |
| 2014/0170475 A1* | 6/2014 | Park | .................... | H01M 4/0404 429/188 |
| 2016/0036035 A1* | 2/2016 | Hayner | ................. | H01M 4/364 429/231.8 |
| 2017/0040598 A1* | 2/2017 | Wang | .................... | H01M 4/386 |

(Continued)

OTHER PUBLICATIONS

Jarno Salonen and Ermei Mäkilä, Thermally Carbonized Porous Silicon and Its Recent Applications, Adv. Mater. 2018, 30, 1703819.*

(Continued)

*Primary Examiner* — Brittany L Raymond
(74) *Attorney, Agent, or Firm* — McAndrews, Held & Malloy, Ltd.

(57) ABSTRACT

Systems and methods for continuous lamination of battery electrodes may include a cathode, an electrolyte, and an anode, where the anode includes a current collector, a cathode, an electrolyte, and an anode, the anode comprising a polymeric adhesive layer coated onto the current collector, and an active material coated onto the polymeric adhesive layer such that the polymeric adhesive layer is arranged between the active material and the current collector, wherein the anode is subjected to a heat treatment to induce pyrolysis after application of the polymeric adhesive layer to the current collector and application of the active material to the polymeric adhesive layer, the heat being applied to the anode at a temperature between 500 and 850 degrees C.

23 Claims, 4 Drawing Sheets

(56) References Cited

U.S. PATENT DOCUMENTS

2017/0324094 A1* 11/2017 Sugiyama ............. H01M 4/587
2018/0062154 A1*  3/2018 Park ..................... H01M 4/667

OTHER PUBLICATIONS

Cho et al., Partially Carbonized Poly (Acrylic Acid) Grafted to Carboxymethyl Cellulose as an Advanced Binder for Si Anode in Li-ion Batteries, J. Electrochem. Sci. Technol., 2019, 10(2), 131-138.*

* cited by examiner

FIG. 4

METHOD AND SYSTEM FOR CONTINUOUS LAMINATION OF BATTERY ELECTRODES

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to a method and system for continuous lamination of battery electrodes.

BACKGROUND

Conventional approaches for battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for continuous lamination of battery electrodes, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
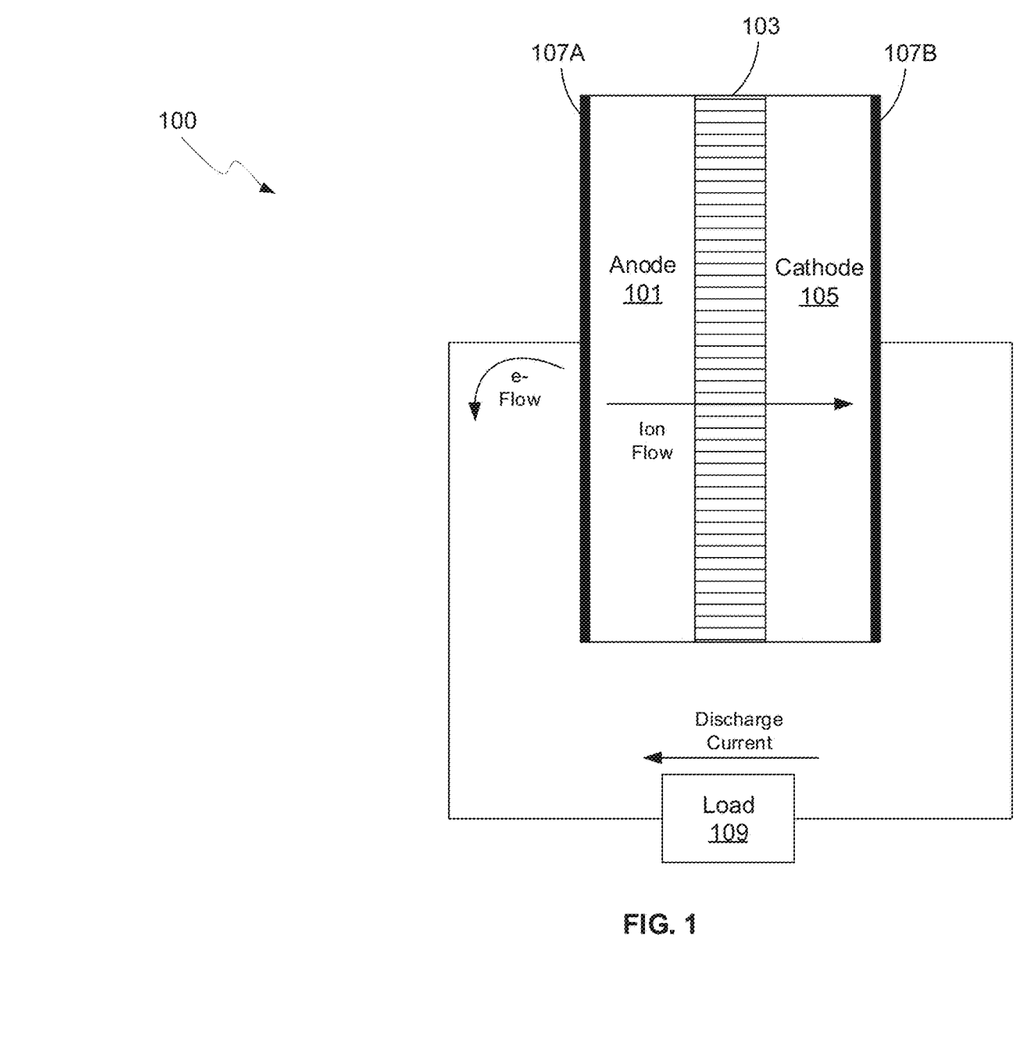
FIG. 1 is a diagram of a battery with anode expansion configured via silicon particle size, in accordance with an example embodiment of the disclosure.

FIG. 1 is a diagram of a battery formed via continuous lamination of battery electrodes, in accordance with example embodiments of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101, which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

A solution to challenges with continuous lamination of battery electrodes is disclosed herein, whereby the anode electrode can be created by applying anode active material layer using a polymer as an interface to a current collector film (e.g., a copper film) in a method of continuous lamination. In some examples, the polymer is applied to the copper film to serve as an adhesive layer. An active material is then applied on top of the adhesive layer, such as by a lamination process. In some examples, the active material includes a polymer having a carbonization temperature lower than that of the adhesive layer. Having applied the active material, the multi-layer film is heat treated (to induce carbonization in the active material and, in some examples, less carbonization in the adhesive layer) to produce the final anode.

In some examples, the anode precursor layer (created from coating an anode slurry) is created on a substrate with a melting temperature greater than the melting temperature of the adhesive layer (e.g., a PET melting temperature, for an underlying substrate using PET would have a higher melting point than the polymer in the adhesive layer). During the lamination process, the substrate is removed from the active material following application of the active material onto the current collector film with the adhesive layer. Temperature, time, and other process conditions, as well as the type of polymers for the active material layer and adhesive layer, may be carefully selected to ensure that there is more carbonization in the active material layer than the adhesive layer. In this example, the adhesive layer will still remain ductile with good flexibility and adhesion since it will be less carbonized than the active material layer.

Thus, the present disclosure applies the active material layer to the adhesive layer (e.g., polymeric layer) on top of the current collector (e.g., copper foil) prior to a heat treatment to induce pyrolysis in the active material layer. Advantages associated with lamination of the active material layer before the pyrolysis step in contrast to lamination after pyrolysis include: 1. The active material layer will be more flexible, 2. The active material layer will be more robust to breakage, and 3. The process can be done at higher speed in a more continuous manner reducing cost.

For formulations with selected current collectors, direct-coated materials (where an active material layer is formed by coating an anode slurry on top of a current collector) may have weaker adhesion to a metallic foil in comparison to standard lamination methods if the anode undergoes pyrolysis where the active material layer contains a polymer (e.g. polyimide (PI), polyamide-imide (PAI)) that is significantly carbonized during the pyrolysis step. During discharge and charge cycles, the resulting active material layer may separate from the current collector due to poor adhesion. In such case, capacity is lost.

The disclosed two-layer direct coating concept provides an adhesive layer (e.g., polyimide (PI) and/or polyamide-imide (PAI)), between the current collector (e.g., copper film) and active materials layer (e.g., anode layer) to increase the adhesion between the two. Once the active materials layer, adhesive layer and current collector are assembled, the multi-layer film is subjected to a heat treatment process. For example, at a low pyrolysis temperature, the less-carbonized portion of the polymer in the adhesive layer may facilitate adhesion between the active material layer and the current collector (e.g., as the PAI layer does in a lamination process). Temperature, time, and other process conditions, as well as the type of polymers for the active material layer and adhesive layer, may be carefully selected to ensure that there is more carbonization in the active material layer than the adhesive layer. In this example, the adhesive layer will still remain ductile with good flexibility and adhesion since it will be less carbonized than the active material layer.

Figure 2:
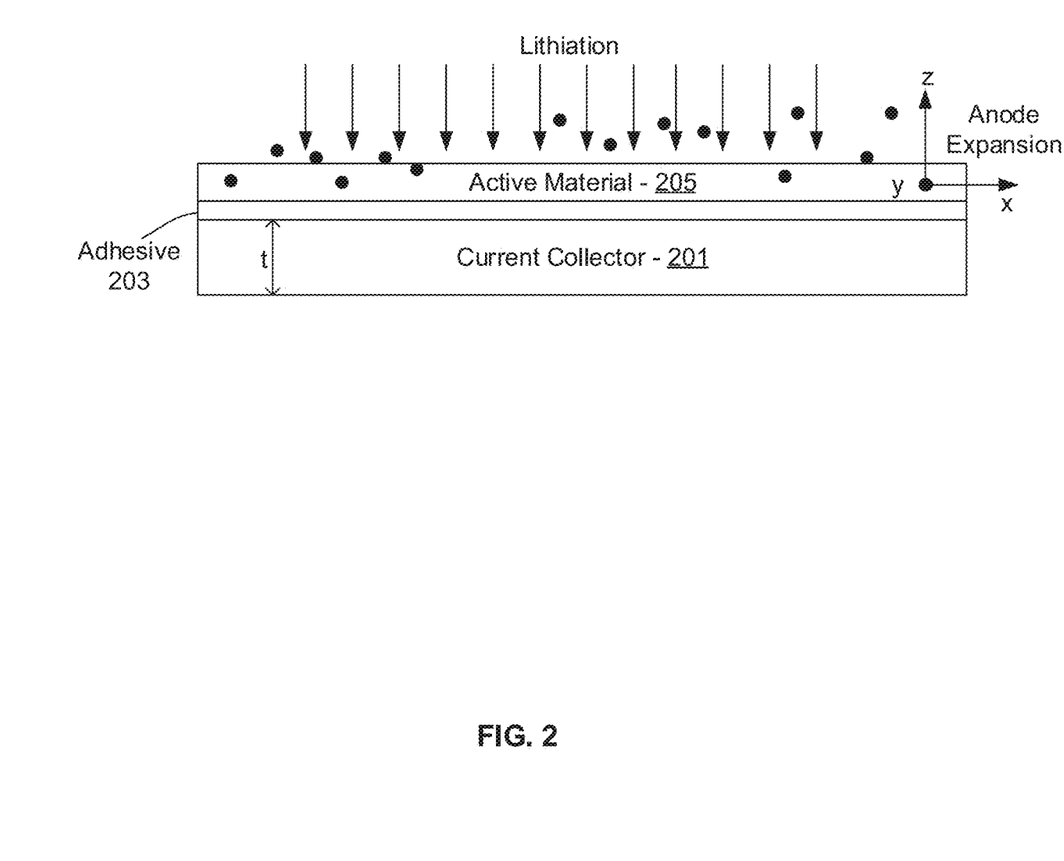
FIG. 2 illustrates an anode, in accordance with an example embodiment of the disclosure.

FIG. 2 illustrates an anode during lithiation, in accordance with an example embodiment of the disclosure. Referring to FIG. 2, there are shown a current collector 201, an optional adhesive 203, and an active material 205. It should be noted that the adhesive 203 may or may not be present depending on the type of anode fabrication process utilized.

In an example scenario, the active material 205 comprises silicon particles in a binder material and a solvent, the active material 205 being pyrolyzed to turn the binder into a pyrolytic carbon that provides a structural framework around the silicon particles and also provides electrical conductivity. The active material may be coupled to the current collector 201 using the adhesive 203. The current collector 201 may comprise a metal film, such as copper, nickel, or titanium, for example, although other conductive foils may be utilized depending on desired tensile strength.

FIG. 2 also illustrates lithium particles impinging upon and lithiating the active material 205. The current collector 201 has a thickness t, which may vary based on the particular implementation. In this regard, in some implementations thicker foils may be used while in other implementations thinner foils are used. Example thicker foils may be greater than 6 □m, such as 10 □m or 20 □m for copper, for example, while thinner foils may be less than 6 □m thick in copper In an example scenario, the adhesive 203 comprises a polymer such as polyimide (PI), polyamide-imide (PAI), Polyacrylic acid (PAA), and Polystyrene sulfonate (PSS), that provides adhesive strength of the active material film 205 to the current collector 201 while still providing electrical contact to the current collector 201. Other adhesives may be utilized depending on the desired strength, as long as they can provide adhesive strength with sufficient conductivity following processing.

In some examples, a two layer direct coating method can be used to produce the anode. For instance, a layer of polymer (e.g., PI, PAI, etc.) is applied to the current collector film 201 (e.g., a 5-20 □m copper foil) to create the adhesive layer 203. The layered film is coated and dried. The layer of active material 205 (e.g., at 1.5-6 mg/cm$^2$ by dry loading, for instance) is then coated on top of the adhesive layer 203 of polymer or the two layers (205 and 203) may be coated simultaneously. The active material 205 may be applied to the polymer from an underlying substrate (e.g., PET), such as via a lamination process. The resulting film is then heat-treated (e.g., at temperatures of 500-850, 600-750 or 700-850 degrees C.), such that the active material is pyrolyzed to form the anode. As such, less-carbonized portions of the adhesive layer may enhance adhesion with the other layers (e.g., with a PAI, PI, PAA layer in a standard lamination process).

In some examples using PI in the adhesive layer, which has a higher carbonization temperature than PAI, carbon conversion is less pronounced for direct coating (e.g., at selected pyrolysis temperatures).

In some examples, an anode precursor layer (e.g., before pyrolysis) is laminated onto a polymer coated copper film, which is then heat-treated to produce the anode. This anode precursor layer can be created through tape casting and or roll casting, for example.

As disclosed herein, the anode electrode is created via a continuous lamination method by application of an anode precursor layer with an interface of a polymer to a metallic film and then subsequently heat-treated to carbonize or partially carbonize the polymers in the multi-layer assembly. The polymer (e.g., adhesive layer 203) could be coated onto the metallic film prior the lamination. The active material (e.g., a green anode) is laminated onto the film prior to heat-treatment. The heat activates pyrolysis, resulting in a strong bonded multi-layer cell. For example, the polymer for the adhesive layer is selected such that when the product is heat-treated, the polymer within the adhesive layer is less pyrolyzed compared to the carbonized polymer within the pyrolyzed anode active material layer.

The anode created by continuous lamination differs from those made from direct coating of an anode active material precursor film onto a current collector and then heat-treating the assembly, which may result in adhesion loss between the copper film and the anode.

In some example embodiments, the anode may not be coated onto the adhesive layer and copper film, but created through a casting process, such as tape casting or roll casting. In some examples, the casting process is performed without the use of a substrate. In some example embodiments, the anode active material precursor layer can be coated onto a substrate, such as a PET substrate. For example, the active material may have a curing temperature that is lower than the melting temperature of the substrate. Therefore, when the layered product is heat treated for curing, the temperature can rise to a level where the active material is cured, yet does not substantially affect the substrate. An example range of temperatures for the heat-treating process of the anode precursor layer and PET substrate can be approximately 150 degrees to 230 degrees Celsius (as a substrate of PET has a melting temperature of approximately 260 degrees C.). Other temperatures to affect heat treatment are considered, such as when the substrate is a material with a different melting temperature.

In some examples, the adhesive layer may include an amount of solvent, which may lower the glass transition temperature or melting temperature of the adhesive layer. The amount of solvent may be selected for a desired result, such as to achieve a particular glass transition temperature. In some examples, the amount of solvent may alter a characteristic of the product (e.g., conductivity, adhesion properties, response to a process parameter, etc.), which may factor into the amount and/or percentage of solvent included during the heat treatment process.

Figure 3:
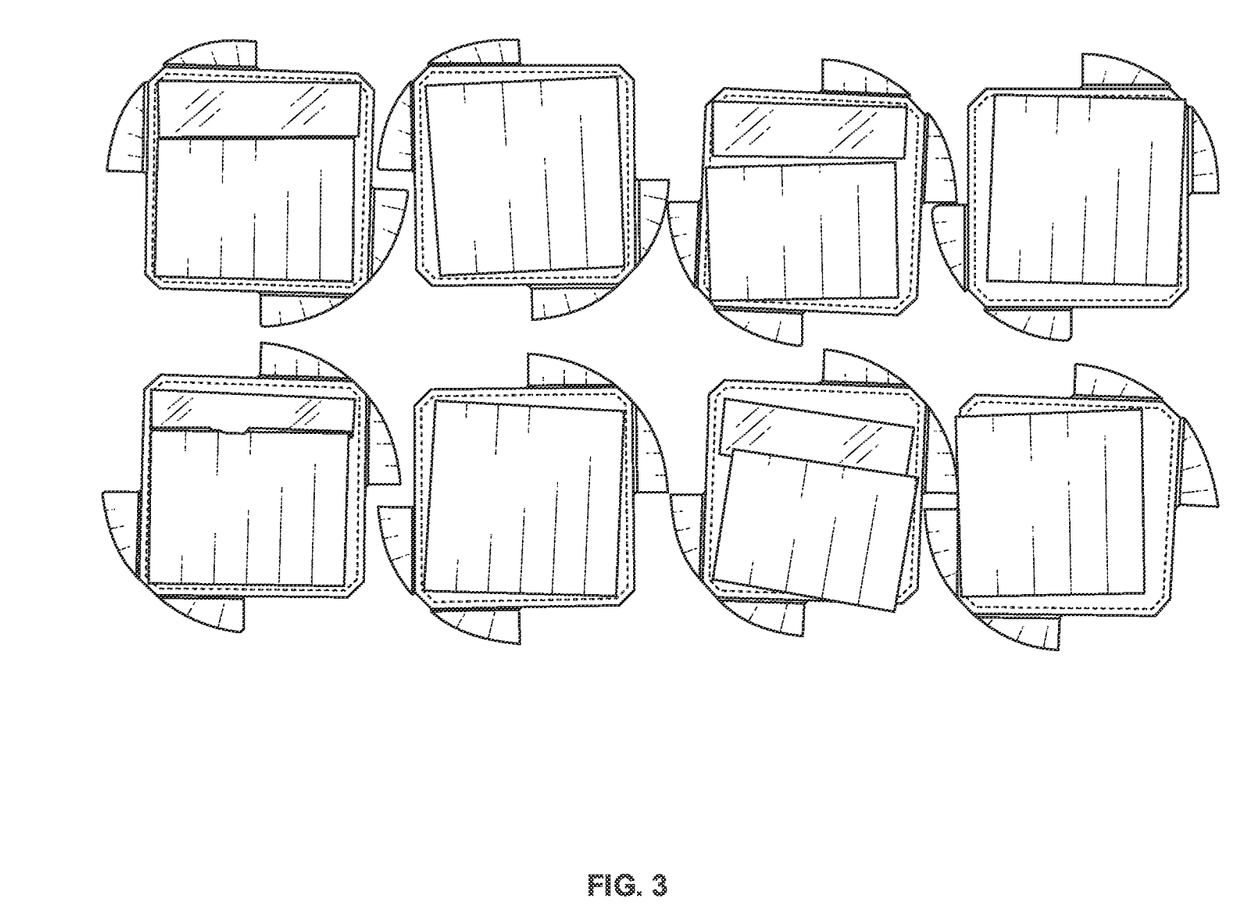
FIG. 3 illustrates examples of anodes created in accordance with an example embodiment of the disclosure.

FIG. 3 provides an example of anodes created by systems and methods disclosed herein. In examples, one or more polymers (e.g., PI, PAA and/or PAI) were used as an adhesive layer in a direct coating method, such that the active material precursor film was directly applied to the polymer adhesive layer during lamination onto the current collector film. With reference to FIG. 3, in an example film produced via this method, the heat-treated anode active material layer represents an active layer 205 and the polymer layer represents the adhesive 203. As disclosed herein, a copper film represents the current collector 201.

In some examples, one or more layers can include a residual solvent, which can affect the glass transition or melting temperature.

In one example embodiment, the anode slurry includes one or more solvents or additives. For instance, PAI may be added to (or remain following a heat treatment of) the anode slurry to lower the carbonization temperature of the anode slurry. The resulting temperature may be below the carbonization temperature of the adhesive layer, thereby enabling pyrolysis to occur to a greater extent in the active material layer versus the adhesive layer.

In some examples, materials (and/or combination of materials) are selected for the active material layer and/or the adhesive layer such that one layer contains a water-based polymer and the other contains a dipolar aprotic solvent based polymer (e.g., an NMP-based polymer), or both contain water-based polymer.

In some examples, a roll lamination process can be applied to the two-layer application concept. For instance, high pressure and temperature may facilitate adhesion between the layers. As disclosed herein, in some examples, a PAI binder can be substituted with a PI binder, and/or PI can be substituted with PAI.

In an example scenario, a metallic film can be used as a substrate (e.g., 18 μm copper foil). A polymeric layer can be applied to the substrate (e.g., a thin layer of polyimide (PI) resin at 0.2-0.6 mg/cm$^2$ loading per side), serving as an adhesive layer. To the polymeric layer, a layer of active material precursor (e.g., a green anode) can be applied (e.g., with a makeup of approximately 94Si:6PAI formulation at 1.56 mg/cm$^2$ loading per side).

Once applied, the multi-layer film is then heat-treated to induce pyrolysis (e.g., increasing temperature at a rate of, for example, 3-15 degrees C./min to reach 500-800° C., with a 10-120 minute dwell time, under Argon environmental treatment). The environment could be substantially free of oxygen or a substantially reducing environment (e.g. forming gas).

In a particular example, the polymer layer includes a Polyimide (PI), which is wet loaded at a given concentration (e.g., approximately 0.2-0.6 mg/cm$^2$), having a given residual solvent composition (e.g., of approximately 5-20%), which may be designed to match one or more standard polymeric (e.g., PAI coated) copper film compositions. In some examples, the resulting PI layer appears shiny, with a good quality application.

In a particular example, the layer of active material is applied with a loading of 1.5-6 mg/cm$^2$.

The disclosed systems and methods address poor coating quality, which can be caused by a surface energy difference between the layers (e.g., between the PI layer and the anode slurry); residual solvent left in the PI layer being released during the pyrolysis step; and/or variations in the coating application and/or composition of the PI layer.

Figure 4:
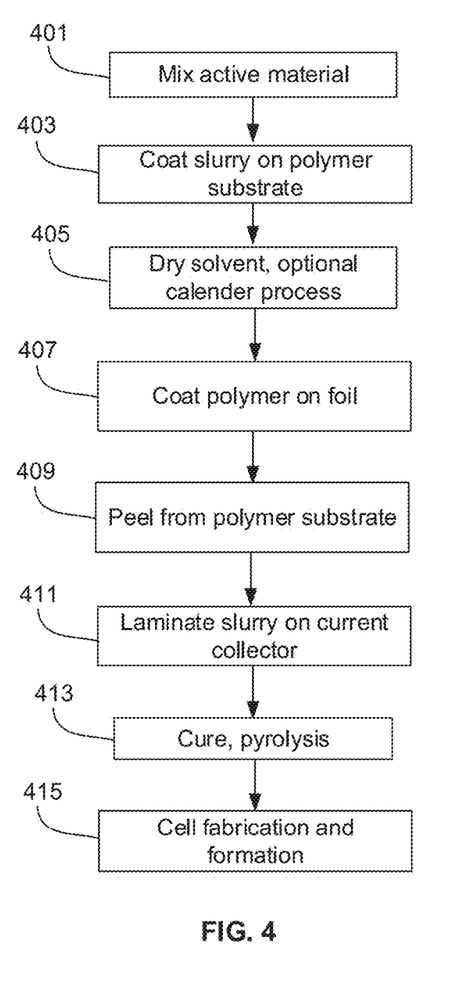
FIG. 4 is a flow diagram of a process for continuous lamination of battery electrodes, in accordance with an example embodiment of the disclosure.

FIG. 4 is a flow diagram of an alternative process for continuous lamination of electrodes, in accordance with an example embodiment of the disclosure. While the previous process to fabricate composite anodes employs a direct coating process, this process physically mixes the active material, conductive additive, and binder together coupled with peeling and lamination processes.

This process is shown in the flow diagram of FIG. 4, starting with step 401 where the active material may be mixed with a binder/resin such as polyimide (PI) or polyamide-imide (PAI), solvent, the silosilazane additive, and optionally a conductive carbon. A graphene/VGCF (1:1 by weight) may be dispersed in NMP under sonication for, e.g., 45-75 minutes followed by the addition of Super P (1:1:1 with VGCF and graphene) and additional sonication for, e.g., 1 hour. Silicon powder with a desired particle size, may then be dispersed in polyamic acid resin (10-20% solids in N-Methyl pyrrolidone (NMP)) at, e.g., 800-1200 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 30%. The particle size and mixing times may be varied to configure the active material density and/or roughness.

In step 403, the slurry may be coated on a polymer substrate, such as polyethylene terephthalate (PET), polypropylene (PP), or Mylar. The slurry may be coated on the PET/PP/Mylar film at a loading of 1.5-6 mg/cm$^2$ (with 13-20% solvent content), and then dried to remove a portion of the solvent in step 405. An optional calendering process may be utilized where a series of hard pressure rollers may be used to finish the film/substrate into a smoothed and denser sheet of material.

In step 407, a current collector (e.g. copper foil) may be coated with a polymeric layer (e.g., polyamide-imide) with a nominal loading of 0.2-0.6 mg/cm$^2$ (applied as a 5-7 wt % varnish in NMP, dried 10-20 hour at 100-140° C. under vacuum).

In step 409, the green film (anode active material precursor) may then be removed from the PET, where the active material may be peeled off the polymer substrate, the peeling process being optional for a polypropylene (PP) substrate, since PP can leave ~2% char residue upon pyrolysis. In some examples, the active material may be peeled off the polymer substrate after the lamination. In some examples, peeling may be skipped, such as an application employing a substrate with a material that can gasify during the pyrolysis step, and/or if char resulting from heating the substrate can be incorporated into the anode.

The peeling may be followed by laminating the active material onto the current collector by tape casting and/or roll press in step 411.

A cure and pyrolysis process is performed in step 413, where the film may be cut into sheets, and vacuum dried using a two-stage process (100-140° C. for 15 h, 200-240° C. for 5 h). The dry film may be thermally treated at 500-850° C. to convert the polymer matrix into carbon. The pyrolysis step may result in an anode active material having silicon content greater than or equal to 50% by weight, where the anode has been subjected to heating at or above 400 degrees Celsius.

In step 415, the electrode may then be sandwiched with a separator and cathode with electrolyte to form a cell. The cell may be subjected to a formation process, comprising initial charge and discharge steps to lithiate the anode, with some residual lithium remaining, and then tested to confirm capacity and cycle life.

In an example embodiment of the disclosure, a method and system are described for forming a battery comprising a cathode, an electrolyte, and an anode, where the anode is created via a continuous lamination process by loading a polymeric layer to a current collector layer, loading an active material to the polymeric layer, and heating the multi-layer anode to induce pyrolyzation in the active material.

In some examples, loading of the active material may be performed at a loading of 1.5-6 mg/cm$^2$ per side. Loading the polymeric layer may be performed at a loading of 0.2-0.6 mg/cm$^2$ per side. Heating may be performed at a rate of increase of 3-15 degrees C. per minute to reach 500-850 degrees C. (e.g., 5 degrees C. per minute to reach 600 degrees C.). Loading of one or both of the active layer and the polymeric layer is performed via a roll lamination process or via tape casting.

In an example embodiment of the disclosure, a battery comprises a cathode, an electrolyte, and an anode. The anode includes a current collector, a polymeric adhesive layer coated onto the current collector, and an active material coated onto the polymeric adhesive layer such that the polymeric adhesive layer is arranged between the active material and the current collector. The anode is subjected to a heat treatment to induce pyrolysis after application of the polymeric adhesive layer to the current collector and application of the active material to the polymeric adhesive layer, where the heat is applied to the anode at a temperature between 500 and 850 degrees C.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A battery, the battery comprising:
    a cathode, an electrolyte, and an anode, the anode comprising:
        a current collector;
        an adhesive layer comprising a first polymer with a first carbonization temperature yielding a first carbonization level following a heat treatment process of a polymeric adhesive layer coated onto the current collector; and
        an active material comprising a second polymer with a second carbonization temperature yielding a second carbonization level greater than the first carbonization level following the heat treatment process, the active material comprising a residual solvent at a concentration of 5-20% applied onto the polymeric adhesive layer prior to the heat treatment,
    wherein the anode is subjected to the heat treatment to induce pyrolysis only after application of the polymeric adhesive layer to the current collector and application of the active material to the polymeric adhesive layer, and
    wherein one or both of a type and an amount of the second polymer enable, at least in part, the second carbonization temperature to be lower than the first carbonization temperature.

2. The battery according to claim 1, wherein the adhesive layer is arranged between the active material and the current collector.

3. The battery according to claim 2, wherein the heat applied reaches a temperature between 500 and 850 degrees C.

4. The battery according to claim 2, wherein the active material is first applied to a polyethylene terephthalate (PET) or polypropylene (PP) substrate, the PET or PP substrate configured to be removed upon application of the active material to the adhesive layer.

5. The battery according to claim 4, wherein the active material and the PET or PP substrate are heat-treated at a temperature range between 150 to 230 degrees C. prior to coating the active material onto the adhesive polymer layer.

6. The battery according to claim 1, wherein the active material comprises Silicon.

7. The battery according to claim 1, wherein the second polymer of the active material comprises polyamide-imide (PAI), or polyimide (PI).

8. The battery according to claim 1, wherein the active material comprises a 90-96 parts Silicon to 4-10 parts polyamide-imide (PAI) formulation.

9. The battery according to claim 1, wherein the first polymer of the polymeric adhesive layer comprises polyimide (PI), polyamide-imide (PAI) or Polyacrylic acid (PAA).

10. The battery according to claim 1, wherein the current collector has a thickness of 5-20 μm.

11. The battery according to claim 1, wherein the active material comprises a water-based polymer and the adhesive layer comprises a dipolar aprotic solvent-based polymer.

12. The battery according to claim 1, wherein the active material comprises a dipolar aprotic solvent-based polymer and the adhesive layer comprises a water-based polymer.

13. The battery according to claim 12, wherein the dipolar aprotic solvent comprises N-Methyl pyrrolidone (NMP).

14. The battery according to claim 1, wherein a carbonization temperature of the residual solvent at a concentration of 5-20% is below a carbonization temperature of the adhesive layer, thereby enabling greater pyrolysis in the active material versus the adhesive layer during the heat treatment.

15. A method of forming a battery, the method comprising:

forming a battery comprising a cathode, an electrolyte, and an anode, wherein the anode is created via a continuous lamination process by;
  loading an active material precursor to a substrate;
  loading a polymeric layer to a current collector layer;
  removing the active material precursor from the substrate;
  loading an active material comprising a residual solvent at a concentration of 5-20% to the polymeric layer; and
  heating the multi-layer anode comprising the active material comprising the residual solvent at a concentration of 5-20% to induce pyrolyzation in the active material,
wherein the heated multi-layer anode comprises an adhesive layer including a first polymer with a first carbonization temperature yielding a first carbonization level following heating, and an active material including a second polymer with a second carbonization temperature yielding a second carbonization level greater than the first carbonization level following heating, and
wherein one or both of a type and an amount of the second polymer enable, at least in part, the second carbonization temperature to be lower than the first carbonization temperature.

16. The method according to claim 15, wherein the heating is performed at a temperature between 500 and 850 degrees C.

17. The method according to claim 15, wherein loading the active material is performed at a rate of 1.5-6 mg/cm$^2$ per side.

18. The method according to claim 15, wherein loading the polymeric layer is performed at a rate of 0.2-0.6 mg/cm$^2$ loading per side.

19. The method according to claim 15, wherein the heating is performed at a rate of increase of 3-15 degrees C. per minute to reach 500-850 degrees C.

20. The method according to claim 15, wherein loading of one or more of the active material or the polymeric layer is performed via a roll lamination process.

21. The method according to claim 15, wherein loading of one or more of the active material or the polymeric layer is performed via tape casting.

22. The method according to claim 15, further comprising, after loading the active material precursor to the substrate, drying the active material precursor to remove a portion of a solvent to a concentration below 20%.

23. A battery, the battery comprising:
  a cathode, an electrolyte, and an anode, the anode comprising:
    a current collector;
    an adhesive layer including a first polymer with a first carbonization temperature yielding a first carbonization level following a heat treatment process of a polymeric adhesive layer coated onto the current collector; and
    an active material including a second polymer with a second carbonization temperature yielding a second carbonization level greater than the first carbonization level following the heat treatment process, the active material comprising a residual solvent at a concentration of 5-20% coated onto the polymeric adhesive layer prior to the heat treatment such that the polymeric adhesive layer is arranged between the active material and the current collector,
  wherein the anode is subjected to the heat treatment to induce pyrolysis only after application of the polymeric adhesive layer to the current collector and application of the active material to the polymeric adhesive layer, the heat being applied to the anode at a temperature between 500 and 850 degrees C., and
  wherein one or both of a type and an amount of the second polymer enable, at least in part, the second carbonization temperature to be lower than the first carbonization temperature.

* * * * *